Dec. 11, 1956 T. L. RUSH 2,773,993
SAFETY CONTROL FOR VEHICLES
Filed Jan. 15, 1953 2 Sheets-Sheet 1
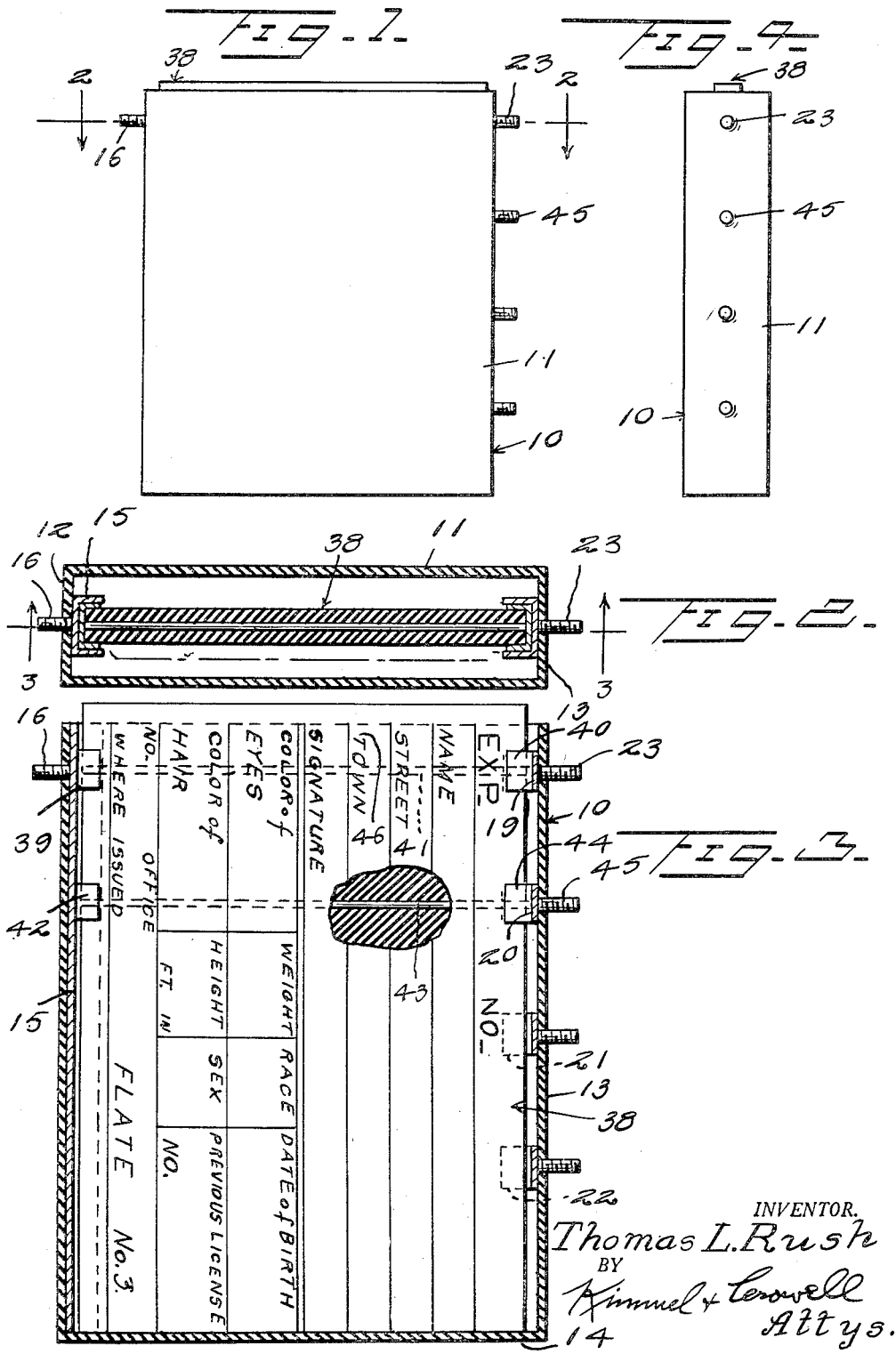
INVENTOR.
Thomas L. Rush
BY
Kimmel & Crowell
Attys.

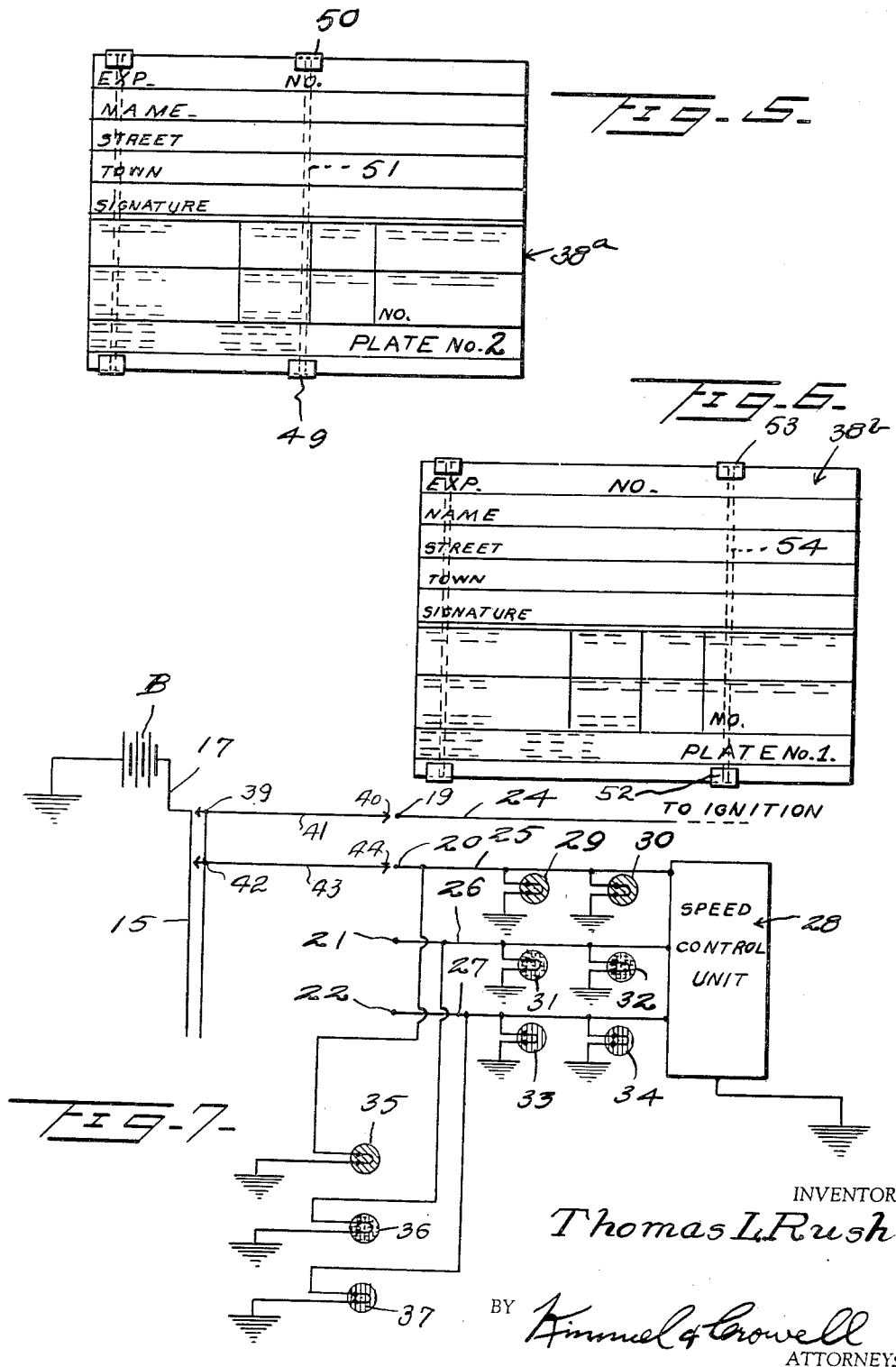

United States Patent Office 2,773,993
Patented Dec. 11, 1956

2,773,993

SAFETY CONTROL FOR VEHICLES

Thomas Lincoln Rush, Iona, Mich.

Application January 15, 1953, Serial No. 331,373

1 Claim. (Cl. 307—10)

This invention relates to a new system and means of driver control for vehicles, whereby any motorized vehicle could be driven only within the limitations imposed upon the individual driver, and the drivers of other vehicles are informed of those limitations. These limitations could be imposed in several ways; by legislation, adult restriction of minors, or voluntary choice on the part of any individual.

This invention was conceived in an effort to reduce the ever increasing accident rate, due to continued improvements in motor vehicle construction, more powerful and smoother motors. The average driver cannot keep pace with these improvements often due to physical and/or mental limitations. He fails to recognize certain natural laws and refuses to obey certain man-made laws. Thus it becomes apparent that a mechanical device could be used in an attempt to minimize the ever increasing accident rate. It is known from past experience that the average driver cannot be trusted to protect himself or others on the highways through the use of ordinary common sense. Some device is needed that will force the average driver to conform to certain natural and man-made laws which exist for protection of himself and others.

With the use of this invention the driver has no choice. By law he is classified, and through the use of the safety control he is forced to conform to that classification.

Another object of this invention is that any limitations which parents or a guardian might wish to impose on their children or charges could be put in force by the use of the driver's plate, also any individual could restrict himself to certain limits by the use of the driver's plate. A beginner's plate would be to great advantage.

This invention would be of great practical use if certain legislation provided sane driving laws and would segregate drivers into several classification; physical, mental, and age qualifications could be factors in the basis for these classifications.

The proper authorities would issue a driver's license plate for each driver upon his taking the required tests which would determine his classification. This plate would fit the breaker unit in any car. The law would require the removal of the plate or key whenever the car was not in use, and it would also be against the law to lend the plate. No car could be driven without a plate in the breaker unit, as only the contact of the plate in the breaker unit completes the ignition circuit. Any person caught using another person's plate would lose his own plate and the other person's late would be confiscated. There are other restrictions which could be written into the law by the proper authorities, but it is believed that this is sufficient to show that under the passing of certain legislation one's plate would become a very precious possession and guarded accordingly.

It is recognized that various electrical speed controls and indicating lights have been patented and are in use at this time. The safety control herein disclosed is used in conjunction with such speed controls and indicating lights in whatever way such legislation, as may be passed, may provide. One such speed control is disclosed in Patent No. 2,019,976.

The safety control herein disclosed is primarily a device which attempts to reduce and minimize the human element in driving a motorized vehicle, such as an automobile, truck, or motorcycle on the public highways. This device consists of several parts which are interengaged into and with the working parts of said vehicle to accomplish certain desired results as may be established by law or as desired by the individual or other interested parties.

With the above and other objects in view, my invention consists in the arrangement, combination and details of construction disclosed in the drawings and specification, and then more particularly pointed out in the appended claim.

In the drawings—

Figure 1 is a detailed side elevation of a safety control unit constructed according to an embodiment of this invention, Figure 2 is a sectional view taken on the line 2—2 of Figure 1, Figure 3 is a sectional view, partly broken away, taken on the line 3—3 of Figure 2, Figure 4 is a detailed end elevation of the unit, Figure 5 is a detailed side elevation of an additional or alternate circuit closing plate used with this invention, Figure 6 is a detailed side elevation of another circuit closing plate used with this invention, Figure 7 is a diagrammatic view showing the electric circuits embodied in this invention.

Referring to the drawings, the numeral 10 designates generally a housing or socket member which is formed of opposite side walls 11, end walls 12 and 13, and a bottom wall 14. One end, such as the upper or front end of the housing 10 is open, the purpose for which will be hereinafter described.

The housing 10 has secured to the inner side of wall 12, an elongated U-shaped contact 15, which forms a common contact as will be hereinafter described. A terminal 16 is secured to the contact 15 and projects through the wall 12 of housing 10 and is adapted to be connected by means of a conductor 17 to one side of an electric supply source indicated at B in Figure 7.

The opposite wall 13 has secured to the inner side thereof vertically spaced apart U-shaped contacts 19, 20, 21 and 22. Contact 19 has secured thereto a terminal 23 projecting through wall 13, which is adapted to be connected by means of a conductor 24 to the ignition of a vehicle. Contacts 20, 21, and 22 are connected by means of conductors 25, 26, and 27 respectively to a speed controlling unit indicated at 28. This speed controlling unit 28 is a conventional electrically operated speed control unit connected with the engine of a vehicle and is of the type generally shown in Patent No. 2,019,976.

Front and rear signal lights 29 and 30 are connected with conductor 25 and front and rear signal lights 31 and 32 are connected with conductor 26. Front and rear signal lights 33 and 34 are connected with conductor 27 and additional signal lights 35, 36, and 37 are mounted on the dashboard of the vehicle and are of the same color or indication as signal lights 29, 31 and 33 respectively.

In order to provide a means whereby the contacts 15, 19, 20, 21 and 22 may be selectively bridged, I have provided a bridging plate unit generally indicated at 38. The bridging unit 38 is constructed in the form of an insulating plate body which has secured to one edge thereof a contact 39, engageable with contact 15. A contact 40 is secured to the opposite edge of plate 38 and is connected with contact 39 by means of a connecting wire 41 which is embedded in insulating plate 38. Contact 40 is adapted to engage contact 19 so that the electric circuit to the ignition will be completed upon insertion of the plate 38 in housing 10.

Plate 38 also has secured to one edge thereof another contact 42 which is connected by means of a wire 43 with an opposite contact 44. Contact 42 engages contact 15, and contact 44 engages contact 20. A terminal 45 is connected to contact 20 and conductor 25 is connected with terminal 45. Conductor 25 is connected to the speed control unit in a manner whereby the driver of a vehicle will have unlimited speed, whereas conductors 26 and 27 are connected to the reduced speed portions of the speed control unit 28.

One face of plate 38 has printed or otherwise impressed thereon indicia 46 which may be in the form of license data conventionally used with the issuance of a vehicle or driver's license. The opposite face of the plate 38 is adapted to have imprinted thereon indicia for use in indicating any traffic violations or the like so that at the end of stated periods, such as the end of each year when a new license is being issued, the violations indicated on the reverse side of plate 38 will be taken into consideration in the issuance of a proper license plate.

Referring now to Figure 5, there is disclosed a reduced speed license plate 38a which is similar in every detail to license plate 38, with the exception that plate 38a includes a pair of contacts 49 and 50 which are connected together by means of an imbedded conductor 51. Contact 49 is adapted to engage contact 15, whereas contact 50 is adapted to engage contact 21.

Referring now to Figure 6, there is disclosed another license plate 38b which is similar to plate 38, with the exception that plate 38b has a pair of contacts 52 and 53 connected together by means of an imbedded conductor 54, and contacts 52 and 53 are adapted to engage contacts 15 and 22.

In the use of this invention it is contemplated that the different communities or states will have legislation requiring limitations on the speed limits of certain individuals who are found incapable of driving vehicles at unlimited speeds. The legislation will, of course, require the use of an electrically operated speed control unit, such as unit 28, and in order to effectuate the operation of the vehicle at the limited speeds, the breaker unit structure or switch unit heerinbefore described will be interposed between the ignition switch and the ignition coil and between the ignition switch and the speed control unit.

The license plate 38 may be of relatively small size so that it may be carried on the person and it is contemplated that when the driver leaves the vehicle the plate 38 will be removed at the same time that the ignition key is removed. In this manner the vehicle is double locked against use. When plate 38 is inserted in the housing 10, the electric circuits with which conductors 24 and 25 are connected will be closed so that the vehicle may upon closing of the ignition switch be operated at unlimited speed. Where a reduced speed is required of the driver, either plate 38a or 38b will be used and when either one of these plates is inserted into the housing 10 the vehicle can only be driven at a speed determined by the unit 28 and with which conductors 26 and 27 are connected.

I do not mean to confine myself to the exact details of construction herein disclosed, but claim all variations falling within the purview of the appended claim.

What I claim is:

In combination, an electrically operated vehicle speed control unit, including a plurality of circuits, each limiting the vehicle to a selected maximum speed, a circuit closing means for connection with said unit, said means comprising a housing formed of opposite side walls, opposite end walls and a bottom wall, a U-shaped contact carried by the inner face of one end wall and extending lengthwise thereof, a terminal fixed to said contact and projecting through said one end wall, a plurality of spaced apart U-shaped contacts fixed to the inner face of the other end wall, a terminal fixed to each of said latter contacts and connected with said unit, a plurality of circuit making and breaking members selectively insertable in said housing, each member being formed of a relatively thin dielectric plate, a pair of contacts on one longitudinal edge of said plate engageable with said first named contact, a second pair of contacts on the opposite longitudinal edge of said plate spaced to engage one only of a selected pair of said plurality of contacts closing a particular one of the speed controlling circuits only, a pair of bridging conductors embedded in said plate and extending from one longiitudinal edge thereof to the other longitudinal edge thereof connecting the contacts on one edge of said plate with the contacts on the opposite edge of said plate, and license indicating matter carried by one side of said plate.

References Cited in the file of this patent

UNITED STATES PATENTS

| | | |
|---|---|---|
| 2,431,381 | Elliott | Nov. 25, 1947 |
| 2,473,664 | Taylor | June 21, 1949 |
| 2,566,017 | Cooley | Aug. 28, 1951 |
| 2,595,769 | Cooley | May 6, 1952 |

FOREIGN PATENTS

| | | |
|---|---|---|
| 667,572 | Germany | Nov. 14, 1938 |